United States Patent Office 3,813,381
Patented May 28, 1974

3,813,381
ETHYLENE POLYMERIZATION WITH AMMONIA MODIFIED CATALYST
Frederick J. Karol, Somerset, N.J., assignor to Union Carbide Corporation, New York, N.Y.
No Drawing. Filed July 17, 1972, Ser. No. 272,420
Int. Cl. C08f 1/64, 3/06, 15/04
U.S. Cl. 260—88.2 R
19 Claims

ABSTRACT OF THE DISCLOSURE

Supported bis-cyclopentadienyl chromium [II] catalysts are modified by treatment with ammonia in order to improve the toughness and impact strength of the resulting ethylene polymers made therewith.

BACKGROUND OF THE INVENTION

(1) Field of the invention

The invention relates to the catalytic polymerization of ethylene, alone, or with other α-olefin monomers.

(2) Definitions

Various of the properties of the polymers discussed herein were determined by the following procedures or test methods:

Density (ASTM D–1505)—Plaque is conditioned for one hour at 120° C. to approach equilibrium crystallinity.
Melt Index (MI) (ASTM D–1238)—Measured at 190° C. reported as decigrams per minute.
Flow Index (HLMI) (ASTM D–1238)—Measured at 10 times the weight used in the melt index test above.
Flow Rate Ratio (FRR)=Flow Index/Melt Index The flow rate ratio is a relative measure of the molecular weight distribution of a resin and is simply the ratio of the flow index value to the melt index value (440 p.s.i. melt index to the 44 p.s.i. melt index). This relationship between the flow rate ratio and molecular weight distribution is based on the phenomenon that polymers having a more narrow molecular weight distribution are more newtonian in melt flow behavior and thus have flows which are less sensitive to shear. Thus, polymers having a more narrow molecular weight distribution have a lower flow rate ratio.

Impact strength: The impact strength of a resin is determined by injection molding the resin into the shape of a dishpan measuring 7" x 9" x 5" and allowing the test specimens to age for 24 hours at room temperature. 5 to 7 molded samples of each resin are then broken by dropping a weight on the bottom of the inverted dishpans at increasing heights until the specimens break. The impact value is reported in foot pounds as the product of the height in feet (at which breakage occurs) and the weight in pounds. As an example, if five specimens break at 6, 6, 7, 8 and 8 feet using a two-pound weight, the reported impact strength value would be 14 foot pounds calculated as follows:

$$\frac{6+6+7+8+8}{5} \times 2 = 14 \text{ foot pounds}$$

(3) Description of the prior art

United Kingdom Pat. 1,253,063 discloses the use of an inorganic oxide supported bis-cyclopentadienyl chromium [II] compound as a catalyst for the polymerization of ethylene, alone, or with other α-olefins.

Although the polymers produced by use of these catalysts have relatively high molecular weights, these polymers tend to have a relatively narrow molecular weight distribution as evidenced by the fact that their flow rate ratio values are relatively low, that is, of the order of about 31 to 55. As a result, these polymers tend to have impact strength values of the order of about 2 to 17 foot pounds at a melt index level of 10 to 17. The impact strength test values are used to evaluate the toughness of the polymer. Toughness of such olefin polymers is a desired property of applications such as household articles, containers, toys and industrial tote boxes. In order to improve, and expand, on the utility of ethylene polymers made with the bis-cyclopentadienyl chromium [II] compound catalysts, therefore, it has been found necessary to attempt to devise ways by which the toughness of polymers made with such catalysts could be improved, at such melt index levels, or to devise ways to retain the existing toughness at higher melt index levels. Depending on the application an improvement in toughness may be exploited in one of two ways. If the existing product is tough enough then it is desirable to make the improved product at a higher melt index while retaining the same toughness. This gives the advantage of easier molding and results in increased production, which is an obvious economic advantage. On the other hand, the improved toughness may be used as a means for allowing the improved polymer to be used in new applications where, without the benefit of this invention, the toughness of the finished article would not be of sufficient toughness at a given level of melt index.

SUMMARY OF THE INVENTION

It has now been found that the toughness of ethylene polymers made by the use of supported bis-cyclopentadienyl chromium [II] catalysts in the polymerization of ethylene, alone, or with other α-olefin monomers, may be substantially improved, if the catalyst is modified by the use therewith of ammonia ($NH_3$).

An object of the present invention is to provide a means for improving the toughness of ethylene polymers prepared with supported bis-cyclopentadienyl chromium [II] catalysts.

DESCRIPTION OF THE PREFERRED EMBODIMENT

In accordance with the teachings of the present invention about 0.01 to 12 mols, and preferably about 0.3 to 6 mols, of ammonia are used to treat each mol of bis-cyclopentadienyl chromium [II] compound in the composite catalysts of the present invention. The ammonia may be used as a gas or as a solution in an inert organic solvent.

The ammonia modifies the supported bis-cyclopentadienyl chromium [II] compound by being added thereto or mixed therewith. The ammonia may be added to the inorganic oxide support before, after, or concurrent with the addition of the organochromium compound thereto.

Although the exact mechanism by which the ammonia functions is not known with certitude, it is believed that this catalyst modifier may form a complex at active sites of the supported catalyst in its role as a catalyst modifier.

Inorganic oxide supported bis(cyclopentadienyl) chromium [II]

The catalyst species comprises an organometallic bis-cyclopentadienyl chromium [II] compound deposited on an inorganic oxide support.

About 0.001 to 10%, or more, by weight of the organometallic compound is used on the support, based on the combined weight of the organometallic compound and the inorganic oxide support. The amount of the organometallic compound which can be deposited on the support varies, depending on the particular support being used, and the activation or dehydration temperature of such support.

Typically about one fourth to one half of the amount of the organometallic compound that could be deposited on the support is used to facilitate introducing the compound into the reactors, but the extremes in amounts of from near zero to total saturation of the support have been used without effect on final polymer properties.

The bis(cyclopentadienyl)chromium [II] compound has the structure

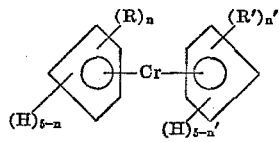

wherein R and R' may be the same or different $C_1$ to $C_{20}$, inclusive, hydrocarbon radicals, and $n$ and $n'$ may be the same or different integers of 0 to 5, inclusive. The R and R' hydrocarbon radicals may be saturated or unsaturated, they may include aliphatic, alicyclic and aromatic radicals such as methyl, ethyl, propyl, butyl, pentyl, cyclopentyl, cyclohexyl, allyl, phenyl and naphthyl radicals.

The bis(cyclopentadienyl) chromium [II] compounds which may be used on the inorganic oxide supports in accordance with the present invention may be prepared as disclosed in U.S. 2,870,183 and U.S. 3,071,605.

The inorganic oxide materials which may be used as a support for the organometallic compounds are materials having a high surface area, that is, a surface area in the range of about 50 to about 1000 square meters per gram. The inorganic oxides which may be used include silica, alumina, thoria, zirconia and other comparable inorganic oxides, as well as mixtures of such oxides.

Because bis(cyclopentadienyl)chromium [II] is sensitive to moisture, the catalyst support should be completely dried before it is brought into contact with the organochromium compound. This is normally done by simply heating or pre-drying the catalyst support with an inert gas prior to use. It has been found that the temperature of drying has an appreciable effect on the relative productivity of the catalyst system and on the molecular weight distribution and the melt index of the polymer produced.

Drying or activation of the support can be accomplished at nearly any temperature up to about its sintering temperature for a period of time which is at least sufficient to remove the absorbed water from the support while at the same time avoiding such heating as will remove all of the chemically bound water from the support. The passage of a stream of dry inert gas through the support during the drying aids in the displacement of the water from the support. Drying temperatures of from about 200° C. to 1000° C. for a short period of about six hours or so should be sufficient if a well dried inert gas is used, and the temperature is not permitted to get so high as to completely remove the chemically bound hydroxyl groups on the surface of the support.

Any grade of support can be used but microspheroidal intermediate density (MSID) silica having a surface area of about 350 square meters per gram and a pore diameter of about 200 A., and intermediate density (ID) silica having a surface area of about 285 square meters per gram and a pore diameter of about 168 A. are preferred. Other grades such as the G–951 silica and G–966 silica-alumina, as designated by W. R. Grace and Co. having surface areas of 700 to 500 square meters per gram, respectively, and pore diameters of 50–70 A. are also quite satisfactory. Variations in melt index control and in polymer productivity can be expected between different grades or types of supports.

The supported catalysts can be prepared by a slurry technique where the selected and properly dried support is added under conditions which exclude the presence of air and moisture to a solution containing the bis(cyclopentadienyl)chromium [II] and solvent to form a slurry. The slurry may be stirred for a period of up to about 4 hours to obtain good adsorption of the bis(cyclopentadienyl) chromium [II] on the support.

The supported catalyst can be used in slurry form or as a semi-solid paste or as a dry free flowing powder. To form the paste or dry powder, the solvent can be filtered, drained or evaporated from the slurry under conditions which exclude oxygen and moisture to yield the desired form of the catalyst.

The dry supported catalyst may also be conveniently prepared in the absence of solvent by direct vapor deposition (sublimation) of the selected bis(cyclopentadienyl) chromium [II] onto a dry support. This may be simply and conveniently accomplished by blending the bis(cyclopentadienyl)chromium [II] compound and support under a dry, inert atmosphere, and then reducing the pressure to cause the bis(cyclopentadienyl)chromium [II] to sublime and adsorb onto the support.

Composite catalysts

The composite catalysts of the present invention, as noted above, are prepared from ammonia, the catalyst modifier, and the above described inorganic oxide supported bis(cyclopentadienyl)chromium [II] compounds.

The composite catalyst is made from about 0.00001 to 5 weight percent of the catalyst modifier and about 0.001 to 10 weight percent of the inorganic oxide supported bis-(cyclopentadienyl)chromium [II] compound. About 0.01 to 12 mols, and preferably about 0.3 to 6 mols, of the catalyst modifier are used per mole of the organochromium compound.

The ammonia is usually added to the inorganic oxide supported bis(cyclopentadienyl)chromium [II] component of the catalyst system prior to the polymerization reaction. The two such components of the catalyst system, however, may also be separately added to the polymerization system. Where the ammonia is added to the inorganic oxide supported bis(cyclopentadienyl)chromium [II] compound, the ammonia may be deposited from a suitable solvent or added directly to the reactor. Suitable solvents which may be used as vehicles for the deposition of the ammonia on the inorganic oxide supported bis(cyclopentadienyl)chromium [II] compound include all the organic solvents listed below which may be used in the polymerization reactions. The solvents, of course, must be inert to the modifier.

When depositing the ammonia on the support with a solution thereof, it is usually necessary to use a solution which contains an excess of the amount of modifier that one desires to deposit on the support, because of equilibrium (adsorption⇌solution) and other factors, such as the pore size of the support and the molecule size of the modifier. Where the modified catalyst is to be used in a solution or slurry polymerization reaction, quantities of the modifier in excess of those actually adsorbed on the supported catalyst can be present in the reaction system.

Care should be taken to avoid having moisture or air, which are catalyst poisons, contact the composite catalyst.

About 0.1 to 0.00001 weight percent of the composite catalyst is used per mol of monomer being polymerized. The amount of catalyst being employed may vary depending on the type of polymerization procedure being employed and the amount of catalyst poisons in the system.

The monomers

Ethylene may be polymerized alone, in accordance with the present invention, or it may be interpolymerized with one or more other alpha-olefins containing 3 to about 12, inclusive, carbon atoms. The other α-olefin monomers may be mono-olefins or non-conjugated di-olefins.

The mono-α-olefins which may be interpolymerized with ethylene would include propylene, butene-1, pentene-1, 3-methylbutene-1, hexene-1, 4-methylpentene-1, 3-ethyl-butene-1, heptene-1, octene-1, decene-1, 4,4-dimethylpentene-1, 4,4-diethyl hexene-1, 3,4-dimethylhexene-1, 4-butyl-1- octene, 5-ethyl-1 decene, 3,3-dimethylbutene-1, and the like. Among the diolefins which may be used are 1,5-hexadiene, dicyclopentadiene, ethylidene norbornene, and other non-conjugated diolefins.

The polymers

The polymers which are prepared in accordance with the teachings of the present invention are solid materials which have densities of about 0.945 to 0.970, inclusive, and melt indexes of about 0.1 to 100 or more.

The preferred polymers are the homopolymers of ethylene. The interpolymers will contain at least 50 weight percent, and preferably at least 80 weight percent, of ethylene

The polymerization reaction

After the composite catalysts have been formed, the polymerization reaction is conducted by contacting the monomer charge, and substantially in the absence of catalyst poisons, with a catalytic amount of the composite catalyst at a temperature and at a pressure sufficient to initiate the polymerization reaction. If desired, an inert organic solvent may be used as a diluent and to facilitate materials handling.

The polymerization reaction is carried out at temperatures of from about 30° C. or less up to about 200° C. or more, depending to a great extent on the operating pressure, the pressure of the entire monomer charge, the particular composite catalyst being used and its concentration. The selected operating temperature is also dependent upon the desired polymer melt index since such temperature is also a factor in adjusting the molecular weight of the polymer. Preferably, the temperature is from about 30° C. to about 100° C. in the conventional slurry or "particle forming" process and from 100° C. to 200° C. in the "solution forming" process. As with most catalyst systems, the use of higher polymerization temperatures tends to produce lower weight average molecular weight polymers, and consequently polymers of higher melt index.

The pressure can be any pressure sufficient to initiate the polymerization of the monomer charge and can be from subatmospheric pressure, using an inert gas as a diluent, to superatmospheric pressure of up to about 1,000,000 p.s.i.g. (pounds per square inch gauge), or more, but the preferred pressure is from atmospheric up to about 1000 p.s.i.g. As a general rule, a pressure of 20 to 800 p.s.i.g. is preferred.

When an inert organic solvent medium is employed in the process of this invention it should be one which is inert to all the other components and products of the reaction system and be stable at the reaction conditions being used. It is not necessary, however, that the inert organic solvent medium also serve as a solvent for the polymer produced. The inert organic solvents which may be used include saturated aliphatic hydrocarbons, such as hexane, heptane, pentane, isopentane, isooctane, purified kerosene and the like, saturated cycloaliphatic hydrocarbons, such as cyclohexane, cyclopentane, dimethylcyclopentane and methylcyclohexane and the like, aromatic hydrocarbons such as benzene, toluene, xylene, and the like and chlorinated hydrocarbons, such as chlorobenzene, tetrachloroethylene, ortho-dichlorobenzene, and the like. Particularly preferred solvent media are cyclohexane, pentane, isopentane, hexane and heptane.

When it is preferred to conduct the polymerization to a high solids level as hereinbefore set forth, it is, of course, desirable that the solvent be liquid at the reaction temperature. For example, when operating at a temperature which is lower than the solution temperature of the polymer in the solvent, the process can be essentially a slurry or suspension polymerization process in which the polymer actually precipitates out of the liquid reaction medium and in which the catalyst is suspended in a finely divided form.

This slurry system is of course dependent upon the particular solvent employed in the polymerization and its solution temperature for the polymer prepared. Consequently, in the "particle form" embodiment, it is most desirable to operate at a temperature which is lower than the normal solution temperature of the polymer in the selected solvent. For example, polyethylene prepared herein may have a solution temperature in cyclohexane of about 90° C., whereas in pentane its solution temperature may be about 110° C. It is characteristic of this "particle form" polymerization system that a high polymer solids content is possible even at low temperatures, if sufficient agitation is provided so that adequate mixing of the monomer with the polymerizing mass can be accomplished. It appears that while the polymerization rate may be slightly slower at the lower temperature, the monomer is more soluble in the solvent medium, thus counteracting any tendency to low polymerization rates and/or low yields of polymer.

It is also characteristic of the slurry process that the monomer appears to have substantial solubility characteristics even in the solids portion of the slurry so that as long as adequate agitation is provided, and the polymerization temperature is maintained, a broad range of size of solid particles in the slurry can be provided. Experience has shown that the slurry technique can produce a system having more than fifty percent solids content, provided conditions of sufficient agitation are maintained. It is particularly preferable to operate the slurry process in the range of 30–40 weight percent of polymer solids.

Recovery of the polymer from the solvent medium is, in this embodiment, reduced to a simple filtration and/or drying operation and no efforts need be expended in polymer clean up and catalyst separation or purification. The residual concentration of catalyst in the polymer is so small it can be left in the polymer.

Operating at temperatures higher than the solution temperature of the polymer in the selected solvent medium also can produce a high polymer solids content in a solution polymerization procedure. The temperature in this type of polymerization system must be sufficiently high to enable the solvent being used to dissolve at least 25–30 percent by weight of the polymer being produced. On the other hand, the temperature must be sufficiently low to avoid thermal destruction of the formed polymer and the particular catalyst employed. In general, for the various solvents and bis(cyclopentadienyl)chromium [II] compound used, temperatures within the range of about 100° C. to about 200° C. and preferably about 120° C. to about 170° C. have been found to be generally optimum for the practice of such solution polymerization procedure. However, the particular polymer being produced must also be taken into account in deciding on the optimum polymerization temperature to be used. For example, ethylene-propylene copolymer which may be produced by this process may be soluble in many of these organic solvents at relatively low temperatures, even though such temperatures may not be useful for the optimum production of ethylene homopolymers.

Solvents constitute one of the most significant and vexing sources of catalyst poisoning. Moreover, in most prior solution polymerization processes employing transition metal-containing catalysts, the use of large quantities of solvent, i.e., a solvent-to-polymer ratio of the order of 20:1, was believed necessary. Such large proportions of solvent, necessarily, greatly increased the catalyst poisoning problem. In the present process, however, the proportion of solvent to polymer can be as low as 0.1:1 or even less, thereby maintaining a very high catalyst productivity and efficiency of the system.

When the solvent serves as the principal reaction medium, it is of course, desirable to maintain the solvent medium substantially anhydrous and free of any possible catalyst poisons such as moisture and oxygen, by redistilling or otherwise purifying the solvent before use in this process. Treatment with an absorbent material such as high surface area silicas, aluminas, molecular sieves and like materials are beneficial in removing trace amounts of contaminants that may reduce the polymerization rate or poison the catalyst during the polymerization reaction.

By conducting the polymerization reaction in the presence of hydrogen, which appears to function as a chain transfer agent, the molecular weight of the polymer may be further controlled.

Experience has shown that hydrogen may be used in the polymerization reaction in amounts varying between about 0.001 to about 10 moles of hydrogen per mole of olefin monomer. For most polymerization reactions, however, the entire molecular weight range may be obtained by using from about 0.001 to about 0.5 mole of hydrogen per mole of monomer.

The homo- or inter-polymerization of ethylene with the catalysts of this invention can also be accomplished in a fluid bed reaction process. An example of a fluid bed reactor and process which can be used for this purpose is disclosed in United Kingdom Pat. 1,253,063.

The following examples are designed to illustrate the present invention and are not intended as a limitation upon the scope thereof.

EXAMPLES 1–17

A series of seventeen comparative examples were run in which ethylene was homopolymerized under slurry polymerization conditions. The catalysts used in Examples 1 to 6 were not modified with ammonia. The catalysts used in Examples 7 to 17 were modified with various amounts of ammonia in the form of a solution thereof.

Each of the catalysts used in these examples was prepared by adding 10 mg. of $(C_5H_5)_2Cr$, as a solution in toluene to a slurry of 0.4 grams of silica in n-hexane. The silica used was Grade 56 intermediate density silica having a surface area of about 285 square meters per gram which had been previously dried or activated at 670° C. for ≥18 hours.

The resulting slurry was then agitated for about 0.5 hours to allow the bis(cyclopentadienyl) chromium [II] compound to deposit on the support.

Where ammonia was used to modify the catalyst, in Examples 7–17, the desired amount thereof was then added to the catalyst slurry as a saturated solution of ammonia in hexane to achieve the desired modification of the catalyst.

Following the addition of the ammonia, the resulting slurry was charged directly to the polmerization vessel.

The polymerization reactions were conducted for one hour at 90° C. under slurry conditions in 500 ml. of hexane under a total pressure of 200 p.s.i.g. Hydrogen was used in various amounts in all the examples and sufficient quantities of the ethylene were used to raise the total pressure to 200 p.s.i.g.

Table I presented below discloses data relating to Examples 1 to 17. The data relates to the variations in the amounts of ammonia and hydrogen that were used, and to the yields and properties of the polymers that were obtained in these experiments. Thus, Table I discloses the milliliters of a saturated solution of $NH_3$ in hexane which contains 0.088 mmol of $NH_3$ per ml. of solution; the mols of $NH_3$; the molar ratio of $NH_3$ to the organochromium compound ($NH_3/Cr$); and the molar ratio of hydrogen to ethylene ($H_2/C_2H_4$) that was used in each experiment; as well as the yield (in grams); melt index (MI—as decigrams/minute); flow index (HLMI—as decigrams/minute); and flow rate ratio (HLMI/MI) of each of the polymers produce in these experiments. The polymers produced in Examples 1–17 were all solid homopolymers of ethylene.

The data shown in Table I indicates that the use of ammonia, in solution form, to modify the catalysts results in a significant lowering of the flow rate ratio (HLMI/MI) property of a polymer having a given melt index. This is an indication of a narrowing of the molecular weight distribution of the polymer, and this narrowing of the molecular weight distribution provides improvements in toughness and impact strength in articles molded from such polymers.

EXAMPLES 18–27

A series of ten comparative examples were run in which ethylene was homopolymerized under slurry conditions. The catalysts used in these examples, Examples 18–27, were modified with various amounts of ammonia in the form of a gas.

The catalysts were prepared, and the polymerization reactions were conducted, as in 1–17, except for the manner of using the ammonia.

Where ammonia was used to modify the catalyst, in Examples 18–27, the desired amount thereof was added as a gas to the polymerization reactor after the silica supported organochromium compound was added to the reactor, but before the monomer or hydrogen were added thereto.

Table II presented below discloses data relating to Examples 18–27, as well as to comparative Examples 1–6, in which no ammonia was used. The data relates to the variations in the amounts of ammonia and hydrogen that were used, and to the yields and properties of the polymers that were obtained in these experiments, as did Table I for Examples 1–17.

The polymers produced in Examples 18–27 were all solid homopolymers of ethylene.

The data shown in Table II indicates that the use of ammonia in gaseous form to modify the catalysts also results in a significant lowering of the flow rate ratio (HLMI/MI) property of a polymer having a given melt index. As noted above, this is an indication of a narrowing of the molecular weight distribution of the polymer, and an indication of an improvement in the toughness and impact strength in articles molded from such polymers.

TABLE I.—USE OF AMMONIA SOLUTION TO MODIFY CATALYST

| Example | $NH_3$ solution (ml.) | $NH_3$ (mmol) | $NH_3/Cr$ (molar ratio) | $H_2/C_2H_4$ (molar ratio) | Yield (gr.) | MI (dg./min.) | HLMI (dg./min.) | HLMI/MI |
|---|---|---|---|---|---|---|---|---|
| 1 | 0 | 0 | 0 | 0.081 | 125 | 0.17 | 7.5 | 44 |
| 2 | 0 | 0 | 0 | 0.081 | 132 | 0.33 | 16 | 48 |
| 3 | 0 | 0 | 0 | 0.081 | 150 | 0.83 | 37 | 44 |
| 4 | 0 | 0 | 0 | 0.081 | 120 | 1.1 | 46 | 42 |
| 5 | 0 | 0 | 0 | 0.111 | 148 | 2.5 | 111 | 44 |
| 6 | 0 | 0 | 0 | 0.132 | 148 | 12 | 430 | 36 |
| 7 | 0.2 | 0.018 | 0.33 | 0.081 | 140 | 3.5 | 127 | 36 |
| 8 | 0.2 | 0.018 | 0.33 | 0.081 | 144 | 3.5 | 127 | 36 |
| 9 | 0.2 | 0.018 | 0.33 | 0.111 | 138 | 7.9 | 287 | 36 |
| 10 | 0.2 | 0.018 | 0.33 | 0.132 | 153 | 8.2 | 314 | 38 |
| 11 | 0.2 | 0.018 | 0.33 | 0.132 | 78 | 11 | 417 | 38 |
| 12 | 0.3 | 0.025 | 0.45 | 0.081 | 130 | 1.5 | 51 | 34 |
| 13 | 0.3 | 0.025 | 0.45 | 0.081 | 87 | 3.1 | 101 | 33 |
| 14 | 0.5 | 0.044 | 0.80 | 0.081 | 92 | 1.4 | 42 | 30 |
| 15 | 0.5 | 0.044 | 0.80 | 0.081 | 79 | 4.1 | 114 | 28 |
| 16 | 0.5 | 0.044 | 0.80 | 0.132 | 114 | 16 | 405 | 25 |
| 17 | 1.0 | 0.088 | 1.60 | 0.081 | 63 | 13 | 288 | 22 |

TABLE II—USE OF AMMONIA GAS TO MODIFY CATALYST

| Example | NH₃ solution (ml.) | NH₃ (mmol) | NH₃/Cr (molar ratio) | H₂/C₂H₄ (molar ratio) | Yield (gr.) | MI (dg./min.) | HLMI (dg./min.) | HLMI/MI |
|---|---|---|---|---|---|---|---|---|
| 1 | 0 | 0 | 0 | 0.081 | 125 | 0.17 | 7.5 | 44 |
| 2 | 0 | 0 | 0 | 0.081 | 132 | 0.33 | 16 | 48 |
| 3 | 0 | 0 | 0 | 0.081 | 550 | 0.83 | 37 | 44 |
| 4 | 0 | 0 | 0 | 0.081 | 120 | 1.1 | 46 | 42 |
| 5 | 0 | 0 | 0 | 0.111 | 148 | 2.5 | 111 | 44 |
| 6 | 0 | 0 | 0 | 0.132 | 148 | 12 | 430 | 36 |
| 18 | 0.5 | 0.021 | 0.38 | 0.081 | 126 | 0.79 | 35 | 44 |
| 19 | 0.5 | 0.021 | 0.38 | 0.081 | 125 | 1.0 | 43 | 43 |
| 20 | 0.5 | 0.021 | 0.38 | 0.081 | 136 | 1.6 | 52 | 32 |
| 21 | 0.5 | 0.021 | 0.38 | 0.081 | 123 | 1.9 | 76 | 40 |
| 22 | 0.75 | 0.030 | 0.55 | 0.081 | 112 | 0.97 | 35 | 36 |
| 23 | 0.75 | 0.030 | 0.55 | 0.111 | 130 | 5.6 | 233 | 42 |
| 24 | 1.0 | 0.041 | 0.75 | 0.081 | 134 | 3.9 | 117 | 30 |
| 25 | 1.0 | 0.041 | 0.75 | 0.081 | 65 | 4.4 | 134 | 30 |
| 26 | 1.0 | 0.041 | 0.71 | 0.111 | 131 | 6.7 | 115 | 42 |
| 27 | 1.5 | 0.062 | 1.12 | 0.111 | 18 | 24 | 522 | 22 |

EXAMPLES 28–29

These two examples were run to demonstrate the utility of the ammonia modified catalyst of the present invention in the preparation of copolymers. Copolymers of ethylene and propylene were prepared in each of the two examples. Example 28 was a control experiment in which ammonia was not used to modify the catalyst. In Example 29, ammonia was used to modify the catalyst.

The catalyst used in each experiment was prepared as in Examples 1–17 by depositing 20 mg. (0.11 mmol) of $(C_5H_5)_2$ Cr on 0.4 grams of intermediate density silica having a surface area of about 285 square meters per gram which had been previously dried or activated at 650° C. for ≥18 hours. The catalyst used in Example 29 was then modified with ammonia by adding 0.018 mmol of $NH_3$ thereto as a solution in hexane. The catalyst slurries were then added to the reactors.

The polymerization reactions were conducted for one hour at 90° C. under a pressure of 20 p.s.i. of $H_2$ and 180 p.s.i. of $C_2H_4$. The copolymer of Example 28 was prepared with 15 grams of propylene and the copolymer of Example 29 was prepared with 14 grams of propylene. The propylene was added to the reactor after all the other components of the reaction system were in the reactor.

The copolymer of Example 28 was obtained in a yield of 148 grams and it had a FRR value of 41. The copolymer of Example 29 was obtained in a yield of 129 grams and it had an FRR value of 34. The lower FRR value of the copolymer of Example 29 is indicative of the toughening of the polymer which was achieved by the use of the ammonia with the catalyst used to make such copolymer.

EXAMPLES 30–37

A series of eight comparative examples were run in which ethylene was homopolymerized under slurry conditions. The catalysts used in Examples 31–37 were modified with various amounts of di-n-butyl amine, instead of with ammonia, to demonstrate that the use of amine type basic materials, in lieu of ammonia, does not produce the same desired effects as are obtained with ammonia. Example 30 was a control experiment and neither ammonia nor the amine was used to modify the catalyst used in that experiment.

The catalysts were prepared, and the polymerizations were conducted, for the most part, as in Examples 1–17.

Where the amine was used, in Examples 31–37, it was added to the catalyst as is, as a liquid. In the catalysts used in Examples 31, 33, 36 and 37, the amine was added to the catalyst slurry after the organochromium compound was deposited on the support. In the catalysts used in Examples 32, 34, and 35, the amine was added to the silica support 30 minutes prior to the addition of the organochromium compound.

The reactions were all conducted for one hour at 90° C. under a hydrogen pressure of 15 p.s.i.g. and an ethylene pressure of 185 p.s.i.g. so as to provide a total pressure of 200 p.s.i.g The composite catalysts used in Examples 30–37 were prepared with 12 mg of the organochromium compound instead of with 10 mg. thereof as in Examples 1–17.

Table III presented hereafter discloses data relating to Examples 30–37. The data relates to the variations in the amounts of the amine that were used, and to the yields and properties of the polymers that were obtained, in these experiments.

The polymers produced in Examples 30–37 were all solid homopolymers of ethylene.

The data shown in Table III indicates that the use of n-butyl amine with the supported bis-cyclopentadienyl chromium II catalysts does not provide any significant decrease in the HLMI/MI ratio values for the polymers made therewith.

EXAMPLES 38–49

A series of comparative examples were run in which ethylene was homopolymerized under slurry conditions. The catalysts used in Examples 40–49 were modified with various amounts of pyridine, instead of with ammonia, to demonstrate that the use of pyridine type basic materials, in lieu of ammonia, does not produce the same desired effects as are obtained with ammonia. Examples 38–39 were control experiments and neither ammonia nor pyridine was used to modify the catalyst used in those experiments.

The catalysts were prepared, and the polymerizations were conducted, for the most part, as in Examples 1–17.

Where pyridine was used, in Examples 40–49, it was added to the catalyst as is, as a liquid. The pyridine was added to the catalyst slurry after the organochromium compound was deposited on the support.

The reactions were all conducted for one hour at 90° C. under a hydrogen pressure of 15 p.s.i.g. and an ethylene pressure of 185 p.s.i.g. so as to provide a total pressure of 200 p.s.i.g. The composite catalysts used in Examples 38–49 were prepared with 12 mg. of the organochromium compound instead of with 10 mg. thereof as in Examples 1–17.

Table IV presented hereafter discloses data relating to Examples 38–49. The data relates to the variations in the amounts of pyridine that were used, and to the yields and properties of the polymers that were obtained, in these experiments.

The polymers produced in Examples 38–49 were all solid homopolymers of ethylene.

The data shown in Table IV indicates that the use of pyridine with the supported bis-cyclopentadienyl chromium I catalysts does not provide any significant decrease in the HLMI/MI ratio values for the polymers made therewith.

TABLE III.—INFLUENCE OF DI-N-BUTYL AMINE ON CATALYST

| Example | Amount of amine added | | Amine/Cr molar ratio | Polymer yield (g.) | Polymer properties | | |
|---|---|---|---|---|---|---|---|
| | Ml. | Mmol | | | MI (dg./min.) | HLMI (dg./min.) | HLMI/MI ratio |
| 30 | 0 | 0 | 0 | 125 | 2.4 | 99 | 41 |
| 31 | 0.001 | 0.006 | 0.091 | 122 | 3.1 | 130 | 42 |
| 32 | 0.002 | 0.012 | 0.18 | 131 | | | |
| 33 | 0.005 | 0.030 | 0.46 | 124 | 6.5 | 232 | 36 |
| 34 | 0.005 | 0.030 | 0.46 | 126 | 3.3 | 155 | 35 |
| 35 | 0.010 | 0.060 | 0.91 | 110 | 7.8 | 293 | 38 |
| 36 | 0.015 | 0.090 | 1.37 | 65 | 2.6 | 109 | 42 |
| 37 | 0.020 | 0.120 | 1.82 | 25 | 2.6 | 117 | 45 |

TABLE IV.—INFLUENCE OF PYRIDINE ON CATALYST

| Example | Amount of pyridine added | | Pyridine/Cr (molar ratio) | Polymer yield (g.) | Polymer properties | | |
|---|---|---|---|---|---|---|---|
| | Ml. | Mmol | | | MI (dg./min.) | HLMI (dg./min.) | HLMI/MI ratio |
| 38 | 0 | 0 | 0 | 126 | 1.4 | 61 | 44 |
| 39 | 0 | 0 | 0 | 125 | 2.4 | 99 | 41 |
| 40 | 0.001 | 0.012 | 0.18 | 149 | 3.1 | 126 | 41 |
| 41 | 0.001 | 0.012 | 0.18 | 132 | 0.61 | 25 | 41 |
| 42 | 0.002 | 0.024 | 0.36 | 149 | 1.7 | 72 | 42 |
| 43 | 0.002 | 0.024 | 0.36 | 131 | 2.9 | 121 | 42 |
| 44 | 0.003 | 0.036 | 0.54 | 120 | 1.3 | 46 | 35 |
| 45 | 0.004 | 0.048 | 0.72 | 57 | 0.96 | 48 | 50 |
| 46 | 0.004 | 0.048 | 0.72 | 49 | 1.0 | 44 | 44 |
| 47 | 0.005 | 0.060 | 0.90 | 87 | 2.2 | 96 | 44 |
| 48 | 0.005 | 0.060 | 0.90 | 68 | 0.81 | 38 | 47 |
| 49 | 0.01 | 0.12 | 1.8 | 0 | | | |

I claim:

1. In a process for polymerizing a monomer charge comprising ethylene by contacting said charge with inorganic oxide supported bis(cyclopentadienyl) chromium [II] catalyst, the improvement which comprises contacting said catalyst with ammonia prior to the contact of said catalyst with said monomer charge, or concurrent therewith.

2. A process as in claim 1 in which about 0.01 to 12 mols of ammonia are used per mol of the organochromium compound.

3. A process in claim 1 in which said monomer charge consists of ethylene.

4. A process as in claim 1 in which said monomer charge comprises ethylene and at least one α-olefin containing 3 to about 12 carbon atoms.

5. A process as in claim 4 in which said monomer charge comprises ethylene and propylene.

6. A process as in claim 1 which is conducted in a solvent.

7. In a process for polymerizing a monomer charge comprising ethylene by contacting said charge with at least one bis(cyclopentadienyl) chromium [II] compound supported on inorganic oxide, said bis(cyclopentadienyl) chromium [II] compound having the structure

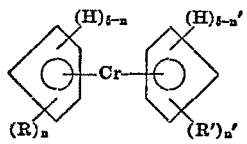

wherein n and n' are each integers of 0 to 5, inclusive, and R and R' are each $C_1$ to $C_{20}$, inclusive, hydrocarbon radicals, and said inorganic oxide having a high surface area and being selected from the group consisting of silica, alumina, thoria, zirconia, and mixtures thereof, the improvement which comprises contacting said catalyst with ammonia prior to the contact of said catalyst with said monomer charges, or concurrent therewith.

8. A process as in claim 7 in which n and n' are 0.

9. A process as in claim 8 in which about 0.01 to 12 mols of ammonia are used per mol of the organochromium compound.

10. A process as in claim 9 in which said support is silica having a surface area of about 50 to 1000 square meters per gram.

11. A process as in claim 10 in which said monomer charge consists of ethylene.

12. A process as in claim 10 in which said monomer charge comprises ethylene and at least one α-olefin containing 3 to about 12 carbon atoms.

13. A process as in claim 12 in which said monomer charge comprises ethylene and propylene.

14. An olefin polymerization catalyst which comprises inorganic oxide supported bis(cyclopentadienyl)chromium [II] and ammonia.

15. A catalyst as in claim 14 in which the support comprises silica having a surface area of about 50 to 1000 square meters per gram.

16. A catalyst as in claim 15 in which about 0.01 to 12 mols of ammonia are used per mol of the organochromium compound.

17. A catalyst as in claim 16 in which about 0.3 to 6 mols of ammonia are used per mol of the organochromium compound.

18. A process as in claim 2 in which about 0.3 to 6 mols of ammonia are used per mol of the organochromium compound.

19. A process as in claim 9 in which about 0.3 to 6 mols of ammonia are used per mol of the organochromium compound.

References Cited
UNITED STATES PATENTS 3,687,920   8/1972   Johnson _____ 260—88.2 R
3,709,853   1/1973   Karapinka _____ 260—88.2 R JOSEPH L. SCHOFER, Primary Examiner A. HOLLER, Assistant Examiner U.S. Cl. X.R.

252—431 R; 260—88.2 B, 94.9 DA